(12) United States Patent
Omori

(10) Patent No.: US 10,950,274 B2
(45) Date of Patent: Mar. 16, 2021

(54) IMAGE RECORDING APPARATUS, METHOD FOR CONTROLLING SAME, AND NON-TRANSITORY COMPUTER-READABLE STORAGE MEDIUM

(71) Applicant: CANON KABUSHIKI KAISHA, Tokyo (JP)

(72) Inventor: Noboru Omori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/671,958

(22) Filed: Nov. 1, 2019

(65) Prior Publication Data

US 2020/0143841 A1    May 7, 2020

(30) Foreign Application Priority Data

Nov. 2, 2018  (JP) .............................. JP2018-207631

(51) Int. Cl.
*G11B 27/10*    (2006.01)
*G06F 3/06*     (2006.01)
*G11B 27/00*    (2006.01)

(52) U.S. Cl.
CPC .............. *G11B 27/10* (2013.01); *G06F 3/064* (2013.01); *G06F 3/0679* (2013.01); *G11B 27/005* (2013.01)

(58) Field of Classification Search
CPC ...... G11B 27/10; G11B 27/005; G06F 3/0679; G06F 3/064; G06F 16/13
USPC ........................................................ 386/241
See application file for complete search history.

(56) References Cited

FOREIGN PATENT DOCUMENTS

| JP | 2015-121925 A | 7/2015 | |
| JP | 2015121925 A * | 7/2015 | ............. G06F 16/13 |

* cited by examiner

*Primary Examiner* — Mishawn N. Hunter
(74) *Attorney, Agent, or Firm* — Cowan, Liebowitz & Latman, P.C.

(57) ABSTRACT

This invention provides an image recording apparatus operable to use a recording unit configured to record an image obtained by an image capturing unit in a recording medium conforming to a standard for an exFAT file system, the image recording apparatus comprising a recording control unit configured to perform control, in accordance with a determination that a recording format for an image to be recorded involves cluster jumping, to record a FAT at a predetermined timing before recording of the image to be recorded is completed even in a case where recording with cluster jumping has not been performed in the recording of the image to be recorded by the recording unit.

12 Claims, 7 Drawing Sheets

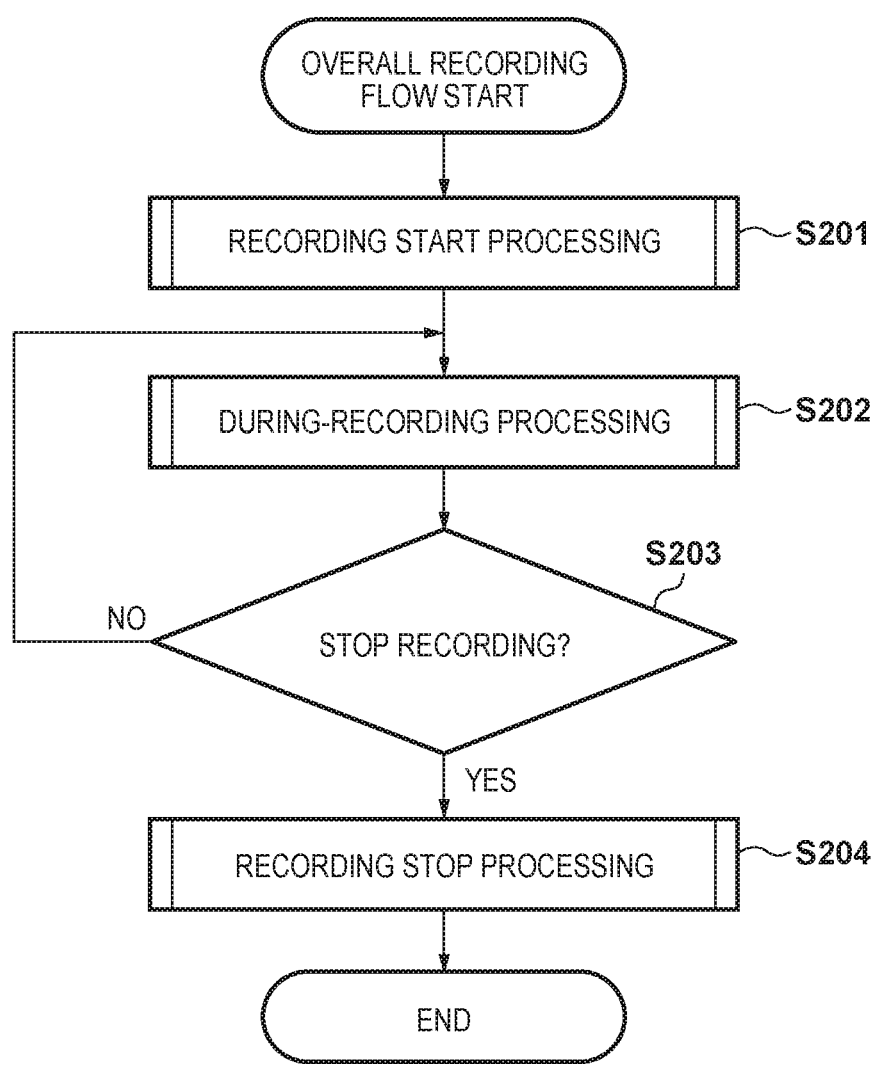

IMAGE RECORDING APPARATUS, METHOD FOR CONTROLLING SAME, AND NON-TRANSITORY COMPUTER-READABLE STORAGE MEDIUM

BACKGROUND OF THE INVENTION

Field of the Invention

The present invention relates to an image recording apparatus and a method for controlling the same, and particularly relates to a data recording technique for a file system.

Description of the Related Art

Typically, data files are recorded in a storage apparatus according to rules for management of storage locations, attributes, and the like of the data files, the rules being referred to as a file system. Various file systems are known according to the type of an Operating System (OS). In particular, for memory cards mounted in image capturing apparatuses typified by digital cameras and digital video cameras, a FAT file system or an exFAT file system is used.

The FAT file system includes actual data of files and metadata such as data block management information referred to as a File-Allocation-Table (FAT) and file index information referred to as directory entries. In contrast, in addition to the configuration of the FAT file system, the exFAT file system includes data block management information referred to as an allocation bitmap. In the exFAT file system, in a case where the data is arranged in continuous areas, only the allocation bitmap is used to manage a data cluster chain. However, in a case where the data is arranged in discontinuous areas, the allocation bitmap and the conventional FAT are used to manage the data cluster chain.

In these circumstances, Japanese Patent Laid-Open No. 2015-121925 has proposed a file access program in which clusters located at continuous addresses are managed by using first management information and clusters located at discontinuous addresses are managed by using the first management information and a discontinuous cluster list.

With a video camera, the time for which one video image is recorded depends on a user's operation. Additionally, the use of variable-length coding also leads to an indefinite amount of data recorded per unit time (bit rate). Since the recording time, the recording bit rate, and the like are thus indefinite, in general, header data recording management information and an index table for video image data is recorded in one file, and the body data of actual data of the video image data is recorded in a separate file. The header data and the body data are then coupled on the file system, for example, while recording of the video image is stopped. At that time, in a case where the header data and the body data are not recorded in continuous areas, cluster chain management only with the allocation bitmap needs to transition to cluster chain management with the allocation bitmap and the FAT.

On the other hand, standards for minimum speed guarantee for the recording medium include a speed class specified by SD Card Association (SDA) and VPG specified by Compact Flash Association (CFA). Some of these standards specify the number of data writes in a file system for management of data files, or provision of a specified amount of buffer in the recording apparatus in accordance with the number of data writes in the file system.

However, in the conventional technologies disclosed in the aforementioned documents, there is a problem in that cluster jumping occurs when the header file and the data file for the video image data are coupled together on an exFAT-enabled medium, and in that a large amount of writing needs to be performed on FAT areas in order to conform to the exFAT standard, leading to deviation from the minimum speed guarantee standard for the medium.

Note that, while recording is stopped, no problem is posed, in many cases, even in the case of deviation from the minimum speed guarantee standard. However, in the case of stoppage of recording such as a file break or a clip break that is performed at a timing when a stream buffer does not have a sufficient free space, deviation from the minimum speed guarantee standard may lead, in some cases, to buffer overflow.

SUMMARY OF THE INVENTION

In view of such problems, an object of the present invention is to provide a technology capable of satisfying both the exFAT standard and the minimum speed guarantee standard for the recording medium while image recording is stopped, allowing the advantage of the minimum speed guarantee to be enjoyed.

According to an aspect of the invention, there is provided an image recording apparatus operable to use a recording unit configured to record an image obtained by an image capturing unit in a recording medium conforming to a standard for an exFAT file system, the image recording apparatus comprising: a recording control unit configured to perform control, in accordance with a determination that a recording format for an image to be recorded involves cluster jumping, to record a FAT at a predetermined timing before recording of the image to be recorded is completed even in a case where recording with cluster jumping has not been performed in the recording of the image to be recorded by the recording unit.

According to the present invention, both the exFAT standard and the minimum speed guarantee standard for the recording medium can be satisfied while image recording is stopped.

Further features of the present invention will become apparent from the following description of exemplary embodiments (with reference to the attached drawings).

BRIEF DESCRIPTION OF THE DRAWINGS

FIG. 2A is a flowchart illustrating operations of the image recording apparatus.

DESCRIPTION OF THE EMBODIMENTS

Embodiments of the present invention will be described in detail hereinafter with reference to the appended drawings.

Note that the scope of the present invention is defined by the claims and is not limited by the following individual embodiments. Additionally, not all combinations of features described in the embodiments are essential to the present invention.

Figure 1:
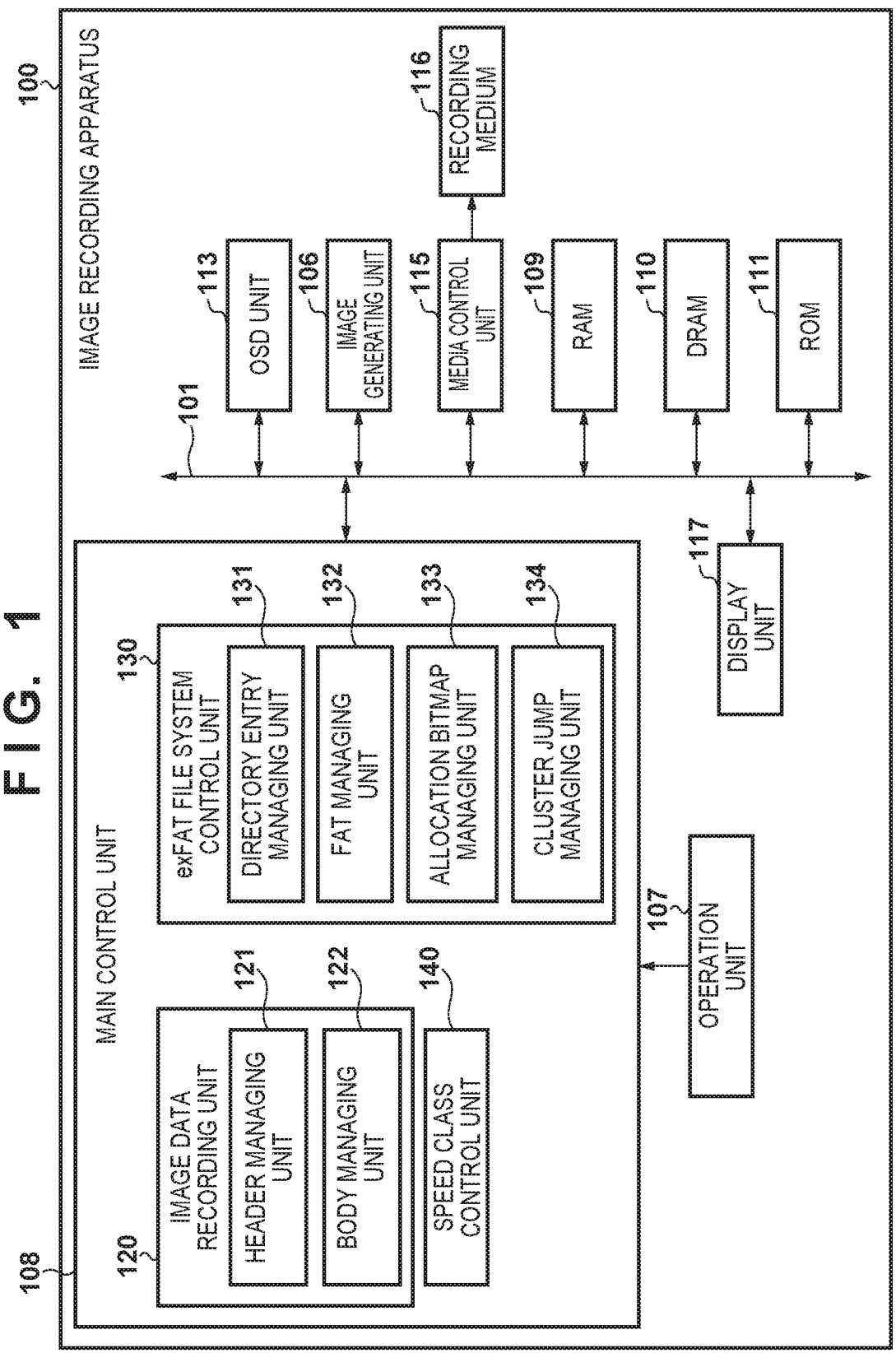
FIG. 1 is a block diagram illustrating an example of a configuration of an image recording apparatus.

FIG. 1 is a block diagram illustrating an example of an internal configuration of an image recording apparatus 100 according to the present embodiment.

In the illustration, a bus 101 is a data bus through which blocks of the image recording apparatus 100 exchange data with one another, and the blocks of the image recording apparatus 100 exchange data with one another via the bus.

An image generating unit 106 generates and stores, in a DRAM 110, image data in a YUV format. The image generating unit 106 includes a lens not illustrated, an imaging sensor, a signal processing unit, and a codec. Additionally, the image generating unit 106 may receive stream data from the outside.

An operation unit 107 is operated by a user for input and includes, for example, a touch panel and operation keys (buttons, dials, levers, or the like). In a case where the user operates the operation unit 107, the operation unit 107 notifies a main control unit 108 of information related to the operation.

The main control unit 108 is a processing unit constituted of a Central Processing Unit (CPU), and controls each block included in the image recording apparatus 100. In particular, by executing the program stored in ROM 111, the main control unit 108 functions as an image data recording unit 120, an exFAT file system control unit 130, and a speed class control unit 140.

The image data recording unit 120 is a block responsible for controlling recording of video image data stored in DRAM 110 in the recording medium 116. The video image data includes header data constituted of management information, meta information, and the like, and body data constituted of images, sounds, metadata per unit time, and the like. The image data recording unit 120 is constituted of a header data managing unit 121 managing header data, and a body managing unit 122 managing body data.

The exFAT file system control unit 130 is a block responsible for control for configuring an exFAT file system in the recording medium 116. When video image data is recorded in the recording medium 116, directory entries, a FAT, and an allocation bitmap need to be appropriately configured into a file system. In particular, the FAT and the allocation bitmap need to be appropriately configured according to a cluster jump state of the video image data. The exFAT file system control unit 130 is constituted of a directory entry managing unit 131 managing directory entries, a FAT managing unit 132 managing the FAT, an allocation bitmap managing unit 133 managing the allocation bitmap, and a cluster jump managing unit 134.

When video image data is recorded, the speed class control unit 140 issues a command conforming to a minimum speed guarantee standard for the recording medium 116. For example, a command for compliance with the aforementioned speed class standard and addresses and sizes of a write command need to be appropriately controlled. It is necessary to appropriately control the addresses and sizes and the number of issuances of the write command, and a command for acquiring information about the recording medium 116, in order to conform to a Video Performance Guarantee (VPG) standard.

A Random Access Memory (RAM) 109 is a volatile memory used by the main control unit 108 as a working area. In particular, a feature of the present invention is that a cluster jump managing unit 134 reserves in advance, in the RAM 109, an area where management information indicating for each file whether to involve cluster jumping or not (hereinafter, a cluster jump flag) is stored.

The Dynamic Random Access Memory (DRAM) 110 is a volatile memory used as a working area by each block of the image recording apparatus 100. Note that the DRAM 110 has an upper limit on the amount of data (read speed/write speed) that can be read or written during a predetermined period of time, thus precluding data read or write beyond the upper limit. Note that the DRAM 110 can be replaced with a high-speed volatile memory or a non-volatile memory based on a mechanism different from the mechanism of the DRAM. Additionally, the RAM 109 and the DRAM 110 may be configured to coexist on the same storage device. Additionally, the DRAM 110 provides a buffer memory space for buffering video image data. The buffering is performed by the main control unit 108 until all of the video image data is recorded in the recording medium 116. In a case where recording speed performance of the recording medium 116 is low, the buffer may overflow, and the main control unit 108 may stop buffering the video image data.

The Read Only Memory (ROM) 111 is a non-volatile recording medium in which programs executed by the main control unit 108 and the like are stored, and is constituted of, for example, a FlashROM. Any of the programs and data stored in the ROM 111 may be loaded into the RAM 109, and the main control unit 108 may execute the loaded program. The program as used herein is a program for performing various sequences described below in the present embodiment, and implements operations of the present embodiment described below.

An On Screen Display (OSD; On Screen Display) unit 113 generates OSD data (display items) such as various setting menus or face frames and arranges the data in the DRAM 110.

A media control unit 115 records the video image data stored in DRAM 110, in the recording medium 116 according to a recording format such as a FAT file system that is compatible with the computer.

The recording medium 116 may be, for example, a memory card. The recording medium is a removable recording medium that is removable from the image recording apparatus 100, and can be mounted in a PC or the like other than the image recording apparatus 100.

A display unit 117 displays OSD data generated by the OSD unit 113 under the control of the main control unit 108.

Now, processing in which the image recording apparatus 100 controls the exFAT file system during recording of the video image data generated by the image generating unit 106 will be described. Description of the embodiment takes, as an example, a video image capturing mode for recording MPEG video image data encoded by an MPEG coding scheme with inter-frame prediction coding. However, the present embodiment is not limited to the inter-frame prediction coding or MPEG coding scheme, and can be applied to recording of any image data.

In recording on the recording medium 116, a subsequent work flow and compatibility need to be ensured by recording image data while constructing a file system conforming with the standard for exFAT or the like.

On the other hand, images generated by video image capturing are generally large in data size. Thus, without command control conforming with the minimum speed guarantee standard for the recording medium, the available capacity of the internal video image data buffer may decrease, leading to recording stop due to buffer overflow.

Accordingly, it is important to provide control conforming to both the file system standard and the minimum speed guarantee standard during recording of video image data.

First, a processing procedure for overall recording performed by the image recording apparatus 100 according to the embodiment will be described with reference to FIG. 2A.

When detecting, via the operation unit 107, input of a recording start instruction performed by the user, the main control unit 108 starts processing related to the overall recording. Note that in this case, the main control unit 108 is assumed to have calculated the code amount per unit time (bit rate) from the speed class of the mounted recording medium 116, the resolution and frame rate of the image to be recorded, and image quality settings.

At S201, the main control unit 108 performs recording start processing.

Details of the recording start processing will be described below.

At S202, the main control unit 108 performs during-recording processing. Details of the during-recording processing will be described below.

At S203, the main control unit 108 determines whether the recording stop instruction has been input. In accordance with a determination that the recording stop instruction has been input, the main control unit 108 advances the processing to S204. Additionally, in accordance with a determination that the recording stop instruction is determined not to have been input, the main control unit 108 continues the during-recording processing at S202 until the instruction is detected. Note that the recording stop instruction includes file breaks used to continuously create a video image file with a fixed size or for a fixed time period, as well as an instruction provided by the user through the operation unit 107.

At S204, the main control unit 108 performs recording stop processing. Details of the recording stop processing will also be described below.

The processing related to the overall recording performed by the image recording apparatus 100 according to the embodiment has been described. Now, details of the recording start processing at S201 will be described with reference to FIG. 2B.

At S211, the main control unit 108 determines whether the video image data to be recorded is in an image format (type) involving cluster jumping. For example, for video image data for a video image file, body data is written to the recording medium 116 a plurality of times to obtain a body file, and while recording is stopped, header data is newly created as a header file. Then, the body file and the header file may be recorded so as to be jointed into one file on the file system. In a case where the positions of the header file and the body file are discontinuous on the recording medium 116, the format is determined to involve cluster jumping. The processing proceeds to S212. On the other hand, in a case where the header is recorded at the start of recording but the header data is updated at the end of recording, writing is performed on discontinuous areas at the end of recording. Thus, the image format is determined to involve cluster jumping. Furthermore, in the description of the present embodiment, the video image data is recorded as a video image file. However, the present invention may also be applicable in a case where, instead of the video image data, still image data is recorded as still image files. For example, the video image file is determined to be in the format involving cluster jumping because the data size is determined at the end of recording and size information needs to be recorded at the end of recording. As for the still image file, the still image file, at the start of recording, may be determined to be in a format involving no cluster jumping because the file is already completed before the start of recording, eliminating a need for cluster jumping for recording.

In addition, in a case where data is recorded in continuous areas with a single write as is the case with still image data in snapshotting or the like, the main control unit 108 determines that the format involves no cluster jumping. In addition, even for video image data, in a case where the bit rate (the code amount per unit time) is higher than a threshold value, the main control unit 108 determines that the recording medium 116 has a sufficiently high writing speed and that the format involves no cluster jumping. In addition, in a case where video image recording is ended at a predetermined time, the main control unit 108 determines that the format involves no cluster jumping.

At S212, the cluster jump managing unit 134 sets "ON" in the cluster jump flag reserved in advance in the RAM 109. The cluster jump flag exists for each file, and thus, in the present embodiment, ON is set in the cluster jump flag for the body file of the video image data.

At S213, the main control unit 108 performs processing of creating a body file. At this time, the directory entry managing unit 131 records, in the directory entries, the file attributes the dates and times of file creation, change, and access, file name length, file name, start cluster number, file size, file allocation flag of the body file, and the like.

At S214, the main control unit 108 references the cluster jump flag stored in the RAM 109 to determine whether the value of the cluster jump flag is ON or OFF. In a case where the cluster jump flag is ON, the main control unit 108 advances the processing to S215. In a case where the cluster jump flag is OFF, the main control unit 108 advances the processing to S216.

At S215, the cluster jump flag is ON, and thus, the main control unit 108 sets NoFATChain of the file allocation flag in the directory entries to 0 (=enabled cluster chain management using the FAT). This is characteristic processing in the present embodiment. Note that in a case where the same value is already set at S213, this processing need not be performed.

At S216, the cluster jump flag is OFF, and thus, the main control unit 108 sets the NoFATChain of the file allocation flag in the directory entries to 1 (=disabled cluster chain management using the FAT). Note that in a case where the same value is already set at S213, this processing may not be performed.

At S217, the body data managing unit 122 of the main control unit 108 records the body data in the recording medium 116. The body data managing unit 122 records file management information such as tag information indicative of the body data of the video image data and size information. In a case where video image data is already generated by the image generating unit 106 and buffered in the DRAM 110, the video image data may be recorded.

At S218, the allocation bitmap managing unit 133 of the main control unit 108 records the allocation bitmap in the recording medium 116.

At S219, the main control unit 108 determines whether the cluster jump flag stored in RAM 109 is ON or OFF. In accordance with a determination that the cluster jump flag to be ON, the main control unit 108 advances the processing to S220. In accordance with a determination that the cluster jump flag to be OFF, the main control unit 108 ends the processing.

At S220, the FAT managing unit 132 of the main control unit 108 records, in the recording medium 116, the FAT corresponding to the file management information recorded at S217, and ends the recording start processing.

Figure 2B:
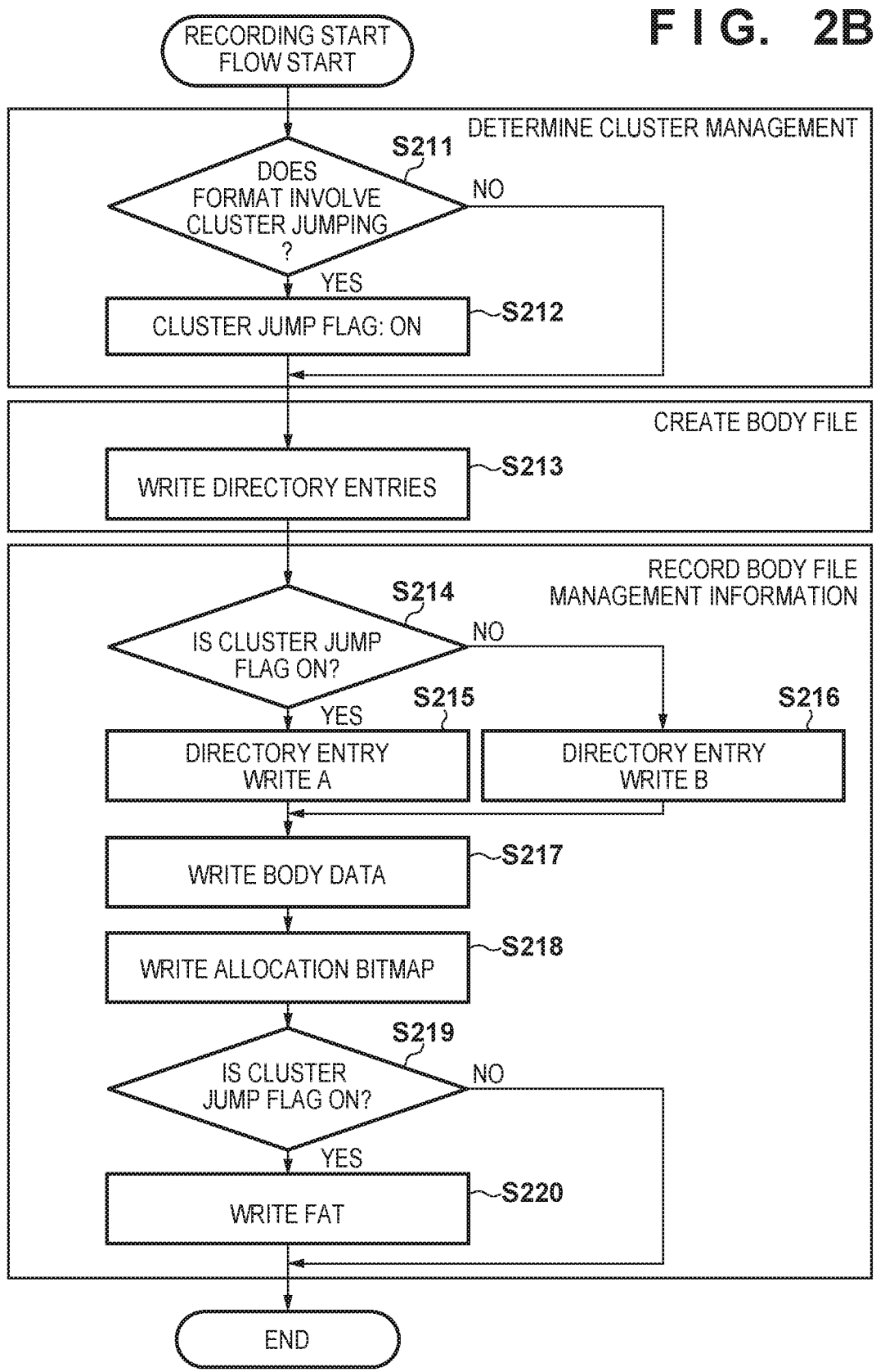
FIG. 2B is a flowchart illustrating operations of the image recording apparatus.

A feature of the present embodiment is that, even in a case where cluster jumping does not particularly occur in the body file when the recording start processing illustrated in FIG. 2B is executed, the cluster jump flag stored in RAM 109 is set to ON and the NoFATChain of the file allocation flag in the directory entries is set to 1 (=disabled cluster chain management using the FAT) at S215.

Figure 2C:
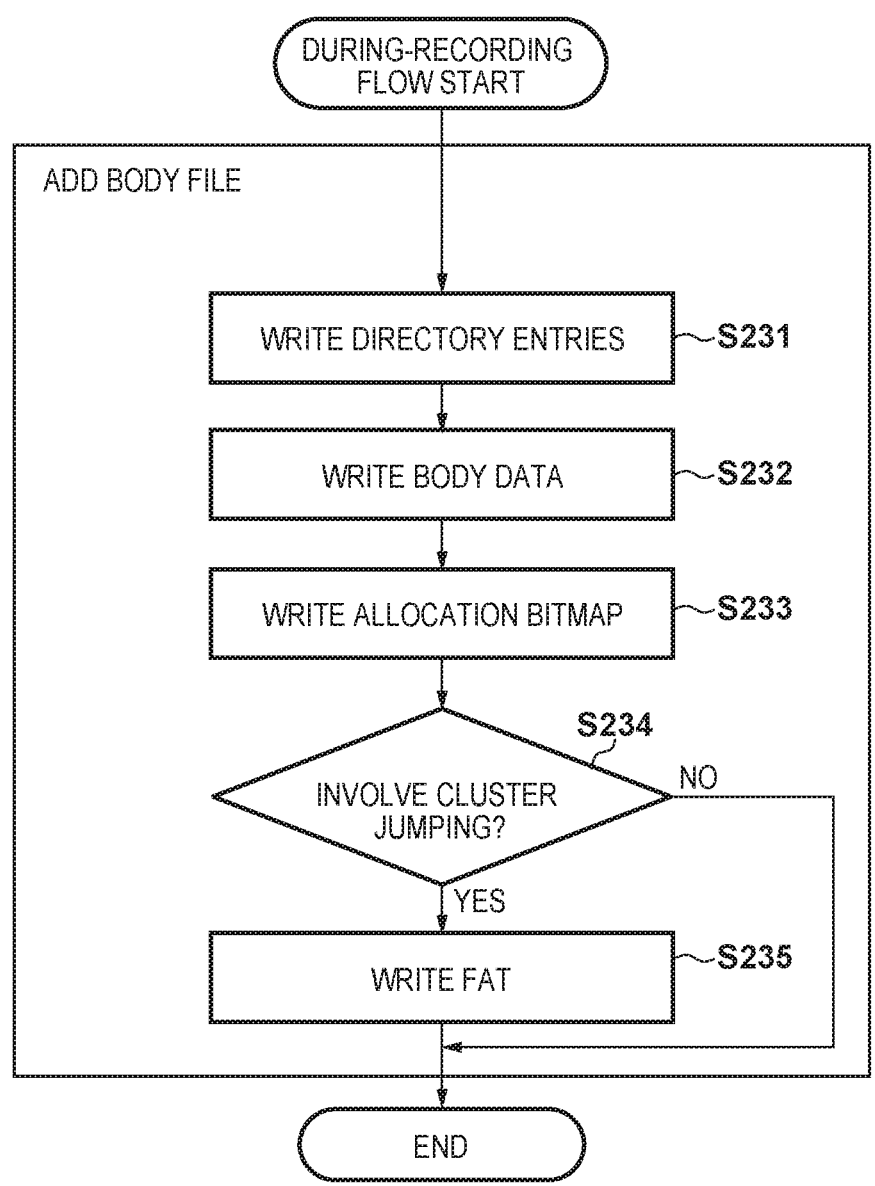
FIG. 2C is a flowchart illustrating operations of the image recording apparatus.

Now, details of the during-recording processing at S202 in FIG. 2A will be described with reference to FIG. 2C. The during-recording processing is executed periodically during recording of video images, and involves recording, in the recording medium 116, the video image data buffered in DRAM 110.

At S231, the directory entry managing unit 131 of the main control unit 108 records, in the directory entries, the dates and times of change and access, the file size of the body file, and the like. Writing is performed on items that are included in the information already recorded at S213. S215, and S216 and that have been changed. Writing may be performed on items that remain unchanged.

The processing includes setting the NoFATChain of the file allocation flag in a case where the cluster jump managing unit 134 determines that cluster jumping will occur in the body file during recording of the video image because another data is already present at a write destination to which the body file is to be written.

Alternatively, the processing includes determining that cluster jumping will occur in the body file and setting the NoFATChain of the file allocation flag in a case where storage areas satisfying the minimum speed guarantee standard for the recording medium (hereinafter, free AU areas) are searched for during recording of the video image and where the ratio of continuous free AU areas to the unit area is lower than a threshold value.

At S232, the body data managing unit 122 of the main control unit 108 records, in the recording medium 116, the video image data buffered in the DRAM 110 and corresponding to the body data. The video image data is recorded in predetermined units. The recording unit of the video image data has a size determined in accordance with a bit rate for the video image data. For example, in a case where the bit rate for the video image data is equal to or higher than 1 Gbps, 16-MB video image data is recorded at S232. In a case where the bit rate for the video image data is equal to or lower than 50 Mbps, 4-MB video image data is recorded in S232. In a case where any other bit rate is used for the video image data, the video image data is recorded at intervals of 8 MB at S232.

At S233, the allocation bitmap managing unit 133 of the main control unit 108 records the allocation bitmap in the recording medium 116.

At S234, the main control unit 108 references the cluster jump flag stored in the RAM 109 or references the NoFATChain of the file allocation flag to determine whether cluster jumping will occur or not. In accordance with a determination that cluster jumping will occur, the main control unit 108 advances the processing to S235. In accordance with a determination that cluster jumping will not occur, the main control unit 108 ends the during-recording processing.

At S235, the FAT managing unit 132 of the main control unit 108 records the FAT in the recording medium 116, and ends the during-recording processing. In other words, for an image involving cluster jumping, the FAT managing unit 132 updates the FAT for each recording operation for the video image data at S232.

In the during-recording processing in the embodiment, even in a case where cluster jumping does not particularly occur in the body file, the cluster jump flag stored in RAM 109 is set to ON, and the NoFATChain of the file allocation flag in the directory entries is set to 1 (=disabled cluster chain management using the FAT). Thus, a feature of the present embodiment is that, each time a predetermined unit of the body data (video image data) is written, the FAT is recorded in the recording medium 116 at S235.

Figure 2D:
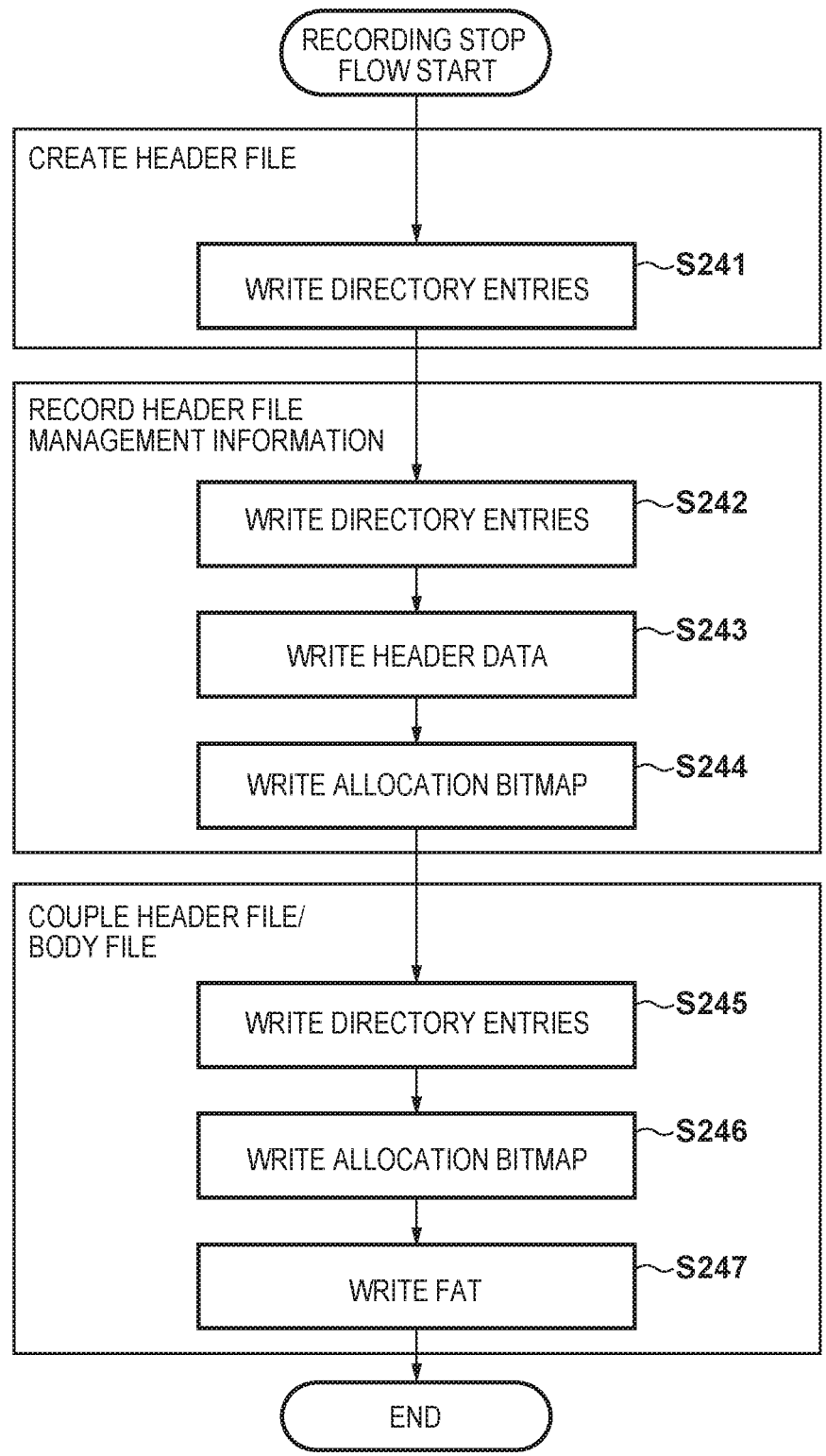
FIG. 2D is a flowchart illustrating operations of the image recording apparatus.

Now, recording stop processing at S204 in FIG. 2A will be described with reference to FIG. 2D.

At S241, the directory entry managing unit 131 of the main control unit 108 executes processing of creating a header file to record, in the directory entries, the file attributes, the dates and times of file creation, change, and access, the file name length, the file name, the start cluster number, the file size, the file allocation flag of the header file, and the like.

At S242, the directory entry managing unit 131 of the main control unit records, in the directory entries, the dates and times of change and access, the file size, the file allocation flag of the header file, and the like. Writing is performed on items that are included in the information already recorded at S241 and that have been changed. Writing may be performed on items that remain unchanged.

At S243, the header data managing unit 122 of the main control unit 108 records the header data in the recording medium 116. At this time, the following are recorded: tag information indicating the header data of the video image data and size information, index information indicating the internal structure of the body data, and the like.

At S244, the allocation bitmap managing unit 133 of the main control unit 108 records the allocation bitmap in the recording medium 116.

At S245, the main control unit 108 couples the header file and the body file together to create directory entries as one video image file. Specifically, the directory entries for the body file are deleted using the directory entries for the header file as a basis. Note that the directory entries for the header file may be deleted using the directory entries for the body file as a basis. Additionally, directory entries for a video image file may be newly created, and the directory entries for the header file and the body file may be deleted. The file size, included in the directory entries for the video image file, is the total of the header data and the body data. However, in a case where padding data or the like is provided, the size of such data is also added. The NoFATChain of the file allocation flag, included in the directory entries for the video image file, is set to 1 (=disabled cluster chain management using the FAT).

At S246, the allocation bitmap managing unit 133 of the main control unit 108 records the allocation bitmap for the header data and the body data in the recording medium 116. In a case where the allocation bit map is already recorded, this processing may be skipped.

At S247, the FAT managing unit 132 of the main control unit 108 records the FAT for the header data and the body data in the recording medium 116. In particular, the FAT is constructed so as to form a cluster chain in which the header data and the body data are joined together into one video image data. The format involving cluster jumping requires recording of all of the FAT corresponding to clusters in which video image file is recorded, and thus, a large amount of FAT needs to be updated. The video image data of a particularly large size requires a large amount of FAT to be updated. However, a feature of the present embodiment is that, since the FAT is already recorded At S220 and S235, even with a large amount of video image data recorded, only a small amount of FAT needs to be recorded at S247. Note that, for the format involving no cluster jumping, the allocation bitmap is updated during recording of the video image data and that, for recording of the FAT, only the FAT for the final cluster may be recorded at the end of recording of the video image file. Thus, during recording of the video image data (video image file), the FAT need not be recorded, and also at the end of recording, it is sufficient that, a small amount of FAT is recorded.

Figure 3A:
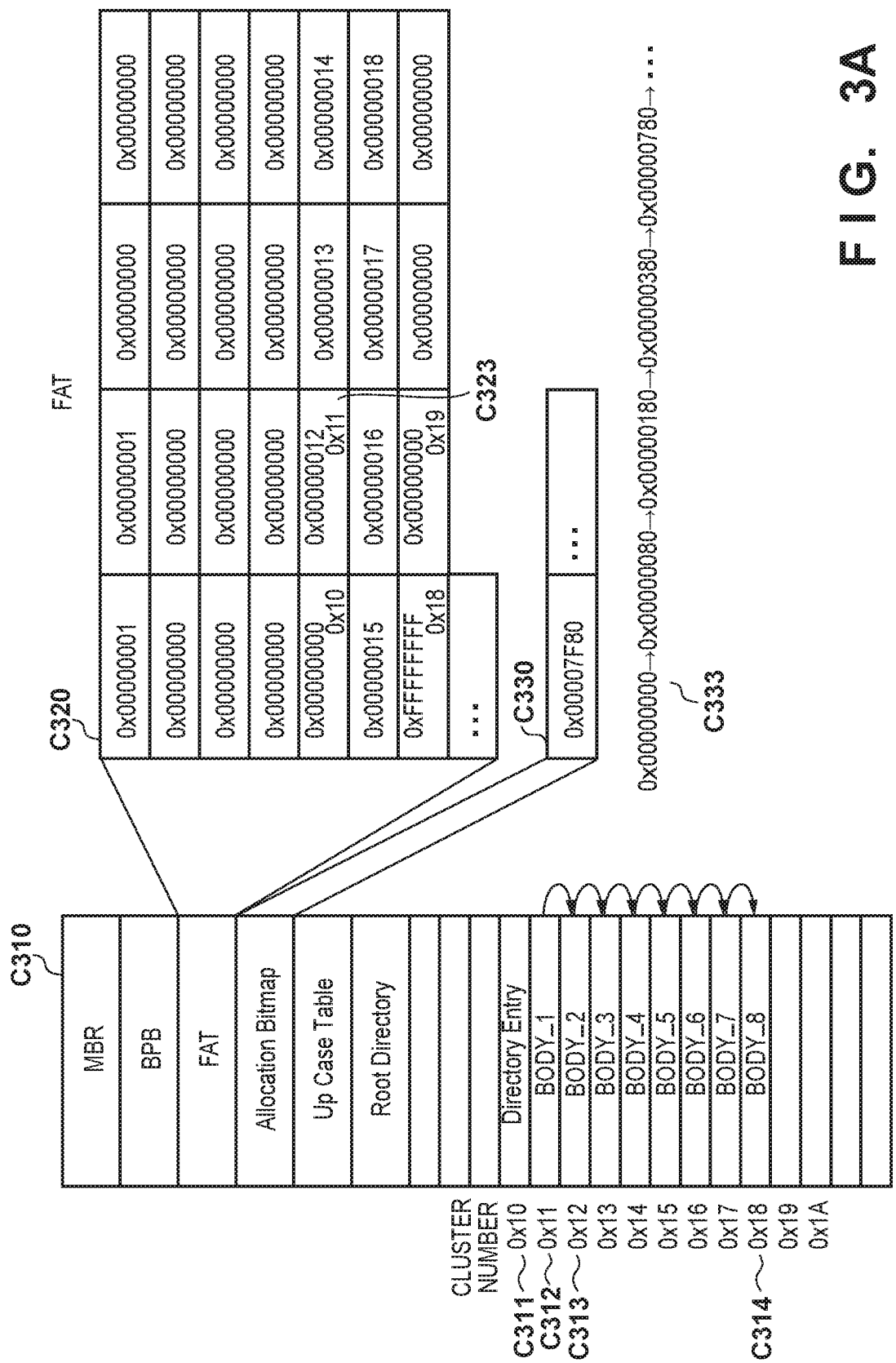
FIG. 3A is a diagram illustrating a data configuration of a recording medium resulting from an operation of the image recording apparatus.
Figure 3B:
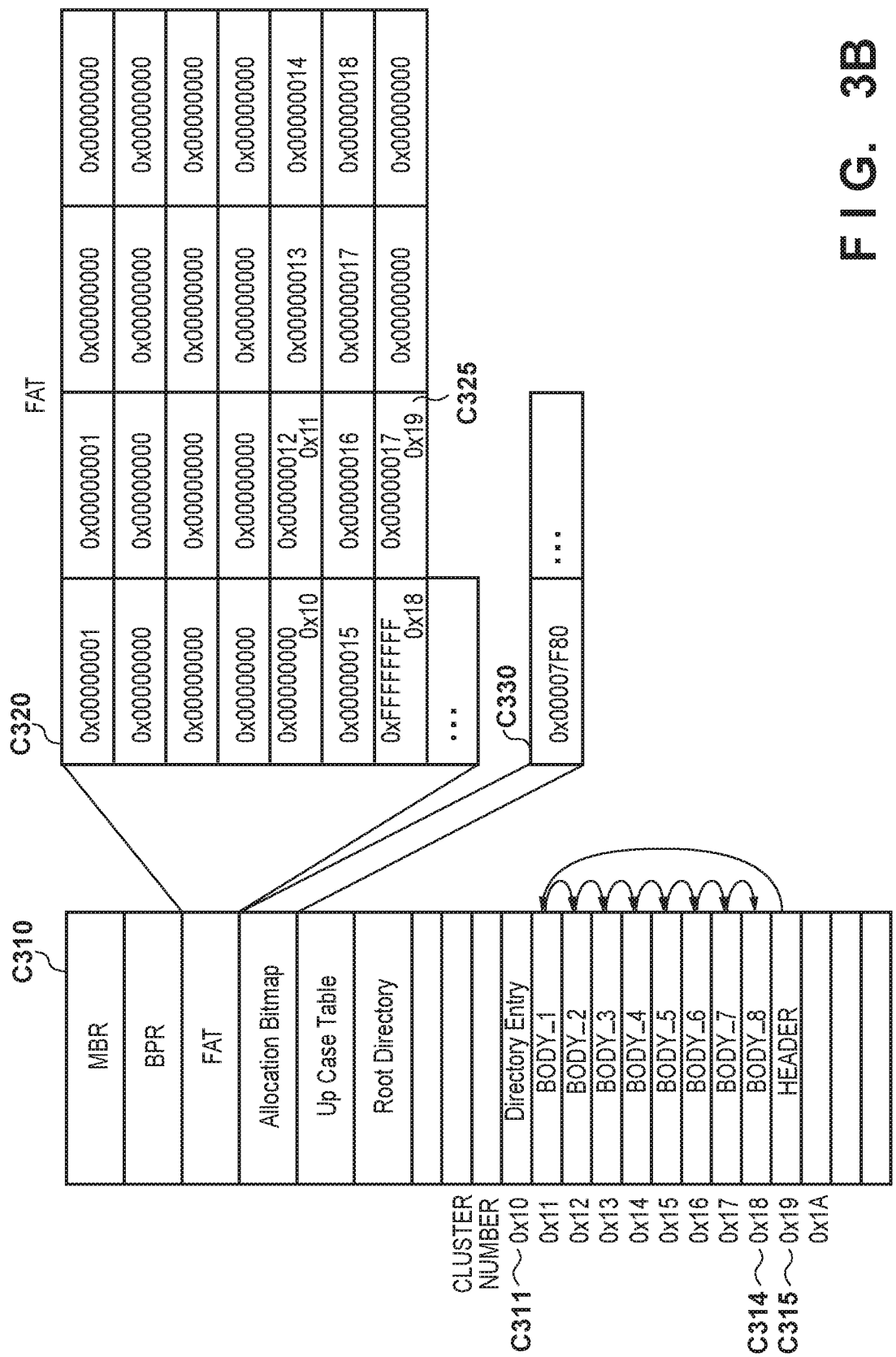
FIG. 3B is a diagram illustrating a data configuration of the recording medium resulting from an operation of the image recording apparatus.

FIGS. 3A and 3B are diagrams illustrating the logical data arrangement, FAT, and allocation bitmap in the recording medium 116 resulting from a series of processing in the flowchart in FIG. 2 during recording of the video image data.

In FIGS. 3A and, 3B, reference numeral C310 denotes the logical data arrangement of the FAT, allocation bitmap, directory entries, and video image data in the recording medium 116, reference numeral C320 denotes data in the FAT and reference numeral C330 denotes data in the allocation bitmap. Here, bits in the allocation bitmap C330 starting with the least significant bit toward the most significant bit are associated with cluster positions managed by the FAT 320 and starting with the leading position.

In FIG. 3A, after body data C312 is recorded in processing S232, body data C313 is recorded in processing S232. Then, in subsequent processing S233, a value indicating that a cluster number 0x12 is consecutively arranged next to a cluster number 0x11 is recorded in an allocation bitmap C333. Subsequently, in processing S235, the value indicating that the cluster number 0x12 is arranged next to the cluster number 0x11 is recorded in the FAT, as illustrated at C323.

As illustrated in FIG. 3B, the during-recording processing proceeds, and when the recording stop processing is executed at a timing when body data C314 is recorded up to a cluster number 0x18, header data C315 is recorded at S244. Subsequently, in processing of coupling the header file and body file together at S247, a value indicating that the cluster number 0x11 is arranged next to a cluster number 0x19 is recorded in the FAT, as illustrated at C325. Here, a feature of the present invention is that only a small amount of FAT information needs to be recorded.

When the present embodiment is not implemented, processing S235 in the during-recording flow is not executed, and thus, the FAT fails to be updated and a large amount of FAT information from C323 to C325 is recorded at the timing of the processing 247 in the recording stop flow: In some instances, the minimum speed guarantee standard fails to be satisfied.

As described above, in the image recording apparatus 100, in a case where cluster jumping occurs in the video image data, the FAT cluster chain is updated in advance during recording of the video image. Thus, both the exFAT standard and the minimum speed guarantee standard for the recording medium can be satisfied while recording of video image is stopped, allowing the advantage of the minimum speed guarantee to be enjoyed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207631, filed on Nov. 2, 2018, which is hereby incorporated by reference herein in its entirety.

What is claimed is:

1. An image recording apparatus comprising: one or more processors executing computer instruction or circuits, to cause the image recording apparatus to use a recording unit configured to record an image obtained by an image capturing unit in a recording medium conforming to a standard for an exFAT file system, the one or more processors executing computer instructions or circuits further cause the image recording apparatus to operate as a recording control unit, to: perform control, in accordance with a determination that a recording format for an image to be recorded involves cluster jumping, to record a FAT at a predetermined timing before recording of the image to be recorded is completed even in a case where recording with cluster jumping has not been performed in the recording of the image to be recorded by the recording unit, and perform control, in accordance with a determination that the recording format for the image to be recorded involves no cluster jumping, not to record the FAT at the predetermined timing, but to record the FAT after recording of the image is completed.

2. The apparatus according to claim 1, wherein the predetermined timing is a timing when the recording unit has recorded a predetermined unit of data of the image to be recorded.

3. The apparatus according to claim 2, wherein the predetermined unit is a data size determined in accordance with a bit rate for the image.

4. The apparatus according to claim 1, wherein, in accordance with a determination that the recording format of the image to be recorded involves cluster jumping, the recording control unit controls to record, each time, the predetermined unit of data of the image to be recorded, and records a FAT related to the recorded predetermined unit of data each time the predetermined unit of data is recorded.

5. The apparatus according to claim 1, wherein in accordance with a determination that the recording format of the image to be recorded involves cluster jumping, in a case where the image to be recorded has a large size, the record control unit performs control to record the FAT at a predetermined timing before recording of the image to be recorded by the recording unit is completed, and the recording control unit controls to record the FAT each time the recording unit records the predetermined unit of the image to be recorded, and in accordance with a determination that the recording format of the image to be recorded involves cluster jumping and in a case where the image to be recorded has a small size, the recording control unit controls to avoid recording the FAT each time the predetermined unit of the image to be recorded is recorded.

6. The apparatus according to claim 1, wherein the recording control unit controls to record FAT at the predetermined timing in a case that the image to be recorded is a video.

7. The apparatus according to claim 1, wherein the one or more processors executing computer instructions or circuits further cause the apparatus to operate as a determining unit, to determine whether the recording format for the image to be recorded involves cluster jumping.

8. The apparatus according to claim 7, wherein the determining unit determines that an image format involves no cluster jumping in a case where the image to be recorded is a video image and where a code amount of the video image per unit time is larger than a preset threshold value.

9. The apparatus according to claim 7, wherein the determining unit determines that an image format involves no cluster jumping in a case where the image to be recorded is a still image or a video image for a preset amount of time.

10. The apparatus according to claim 7, wherein the one or more processors executing computer instructions or circuits further cause the apparatus to operate as a managing unit that utilizes one or more computer processors for managing continuous free AU areas; wherein the determining unit determines that an image format involves cluster jumping in a case where a ratio of the continuous free AU areas managed by the managing unit is lower than a threshold value.

11. A method for controlling an image recording apparatus operable to use a recording unit to record an image obtained by an image capturing unit in a recording medium conforming to a standard for an exFAT file system, the method comprising: performing control, by a processor of the image recording apparatus, in accordance with a determination that a recording format for an image to be recorded involves cluster jumping, to record a FAT at a predetermined timing before recording of the image to be recorded is completed even in a case where recording with cluster jumping has not been performed in the recording of the image to be recorded by the recording unit, and performing control, in accordance with a determination that the recording format for the image to be recorded involves no cluster jumping, not to record the FAT at the predetermined timing, but to record the FAT after recording of the image is completed.

12. A non-transitory computer-readable storage medium storing a computer program which, when read and executed by a processor in an image recording apparatus operable to use a recording unit to record an image obtained by an image capturing unit in a recording medium conforming to a standard for an exFAT file system, causes the processor to execute the step of a method, the method comprising: performing control, in accordance with a determination that a recording format for an image to be recorded involves cluster jumping, to record a FAT at a predetermined timing before recording of the image to be recorded is completed even in a case where recording with cluster jumping has not been performed in the recording of the image to be recorded by the recording unit, and performing control, in accordance with a determination that the recording format for the image to be recorded involves no cluster jumping, not to record the FAT at the predetermined timing, but to record the FAT after recording of the image is completed.

* * * * *